United States Patent
Kato et al.

(10) Patent No.: US 10,941,681 B2
(45) Date of Patent: Mar. 9, 2021

(54) OIL PUMP AND BALANCER UNIT OF OIL PUMP INTEGRATED TYPE

(71) Applicant: HITACHI AUTOMOTIVE SYSTEMS, LTD., Hitachinaka (JP)

(72) Inventors: Daisuke Kato, Novi, MI (US); Atsushi Naganuma, Atsugi (JP); Yasushi Watanabe, Kanagawa (JP); Hideaki Ohnishi, Atsugi (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/474,452

(22) PCT Filed: Dec. 18, 2017

(86) PCT No.: PCT/JP2017/045286
§ 371 (c)(1),
(2) Date: Jun. 27, 2019

(87) PCT Pub. No.: WO2018/123682
PCT Pub. Date: Jul. 5, 2018

(65) Prior Publication Data
US 2019/0345852 A1    Nov. 14, 2019

(30) Foreign Application Priority Data
Dec. 28, 2016   (JP) .............................. JP2016-254592

(51) Int. Cl.
*F01M 1/02* (2006.01)
*F04C 2/344* (2006.01)
(Continued)

(52) U.S. Cl.
CPC ................ *F01M 1/02* (2013.01); *F01M 1/16* (2013.01); *F04C 2/344* (2013.01);
(Continued)

(58) Field of Classification Search
CPC .... F01M 1/02; F01M 1/16; F01M 2001/0223; F01M 2001/0238; F01M 2001/0269;
(Continued)

(56) References Cited

U.S. PATENT DOCUMENTS

| 2006/0120908 A1* | 6/2006 | Ohnishi | ................ F04C 11/001 418/61.3 |
|---|---|---|---|
| 2009/0133661 A1 | 5/2009 | Schober et al. | |

(Continued)

FOREIGN PATENT DOCUMENTS

JP    2015-078683 A    4/2015

OTHER PUBLICATIONS

Supplementary European Search Report issued in corresponding European Patent Application No. 17889254 dated Oct. 28, 2019.
(Continued)

*Primary Examiner* — Jacob M Amick
(74) *Attorney, Agent, or Firm* — Foley & Lardner LLP

(57) ABSTRACT

Oil pump and oil pump-integrated balancer device each have a pump housing formed by housing body 31 and cover member 32, pump shaft 33 having driven side helical gear 43 at which thrust force occurs when transmitting rotation force and rotating a rotor by the rotation force provided from drive side helical gear 13 that is engaged with driven side helical gear 43, first and second thrust receiving portions 47, 46 formed close to hole edges of bearing holes 32a, 31a of the cover member and the housing body, and first and second thrust limiting portions 49, 48 provided at the driven side helical gear and the pump shaft, contacting the thrust receiving portions from axis direction and limiting thrust movement of the pump shaft. With this configuration, oil pump and oil pump-integrated balancer device which are capable of securing stable support of the pump shaft are provided.

20 Claims, 12 Drawing Sheets

(51) Int. Cl.
    *F04C 15/00*    (2006.01)
    *F01M 1/16*    (2006.01)
(52) U.S. Cl.
    CPC . *F04C 15/0003* (2013.01); *F01M 2001/0223* (2013.01); *F01M 2001/0238* (2013.01); *F01M 2001/0269* (2013.01); *F01M 2001/0276* (2013.01); *F04C 2240/50* (2013.01)
(58) Field of Classification Search
    CPC ............ F01M 2001/0276; F04C 2/344; F04C 15/0003; F04C 2240/50; F04C 2240/52; F04C 2240/56; F04C 2240/801
    See application file for complete search history.

(56)       References Cited

U.S. PATENT DOCUMENTS

2015/0104343 A1    4/2015  Lee
2015/0252802 A1*   9/2015  Imanaga ............... F04C 2/3441
                                                        418/24

OTHER PUBLICATIONS

International Search Report dated Mar. 20, 2018 in International Application No. PCT/JP2017/045286.
Written Opinion dated Mar. 20, 2018 in International Application No. PCT/JP2017/045286.

* cited by examiner

US 10,941,681 B2

OIL PUMP AND BALANCER UNIT OF OIL PUMP INTEGRATED TYPE

TECHNICAL FIELD

The present invention relates to an oil pump and an oil pump-integrated balancer device for, for example, an internal combustion engine.

BACKGROUND ART

An oil pump for lubricating an internal combustion engine disclosed in, for instance, the following Patent Document 1 is directly driven by balancer shafts of a balancer device.

For transmission of a rotation force of the balancer shafts, in order to reduce noise and vibration caused by backlash, helical gears whose contact areas are large are generally used. However, when these helical gears are used, a load in a thrust direction acts on each of the balancer shafts. For this reason, the balancer shafts are supported by thrust bearings that receive the thrust loads. The oil pump itself, directly driven by the balancer shafts, therefore does not specially require the thrust bearing.

CITATION LIST

Patent Document

Patent Document 1: Japanese Unexamined Patent Publication No. JP2015-78683

SUMMARY OF THE INVENTION

Technical Problem

Here, the balancer shafts of a normal balancer device rotate at double the rotation speed (the number of revolutions) of a crankshaft of the internal combustion engine. However, depending on oil pump's requirements, there is a case where the oil pump cannot be directly driven at the rotation speed of the balancer shaft. Therefore, it is conceivable that using gears such as helical gears on which the load in the thrust direction acts, the rotation speed (the number of revolutions) of the balancer shaft is transmitted to a pump shaft of the oil pump with the rotation speed decreased while suppressing increase in the noise and vibration.

However, in the case where the pump shaft is driven and rotated by the gears on which the load in the thrust direction acts, if variation in rotation torque occurs, there is a risk that a load in a thrust direction will occur at the pump shaft then support of the pump shaft will be unstable.

An object of the present invention is therefore to provide an oil pump and an oil pump-integrated balancer device that are capable of securing stable support of the pump shaft even if the load in the thrust direction will occur at the pump shaft.

Solution to Problem

According to one aspect of the present invention, an oil pump comprises: a pump housing accommodating therein a pump element; a pump shaft having a driven gear at which a thrust force occurs when transmitting a rotation force, the pump shaft being configured to be able to move relative to the pump element in an axis direction and drive the pump element by the rotation force provided from an external gear that is engaged with the driven gear; a pair of thrust limiting portions provided at the pump shaft; and a pair of thrust receiving portions provided at the pump housing and contacting the pair of thrust limiting portions respectively.

Effects of Invention

According to the present invention, it is possible to secure the stable support of the pump shaft even if the load in the thrust direction will occur at the pump shaft.

EMBODIMENTS FOR CARRYING OUT THE INVENTION

Embodiments of an oil pump of the present invention will be explained below with reference to the drawings.

First Embodiment

Figure 1:
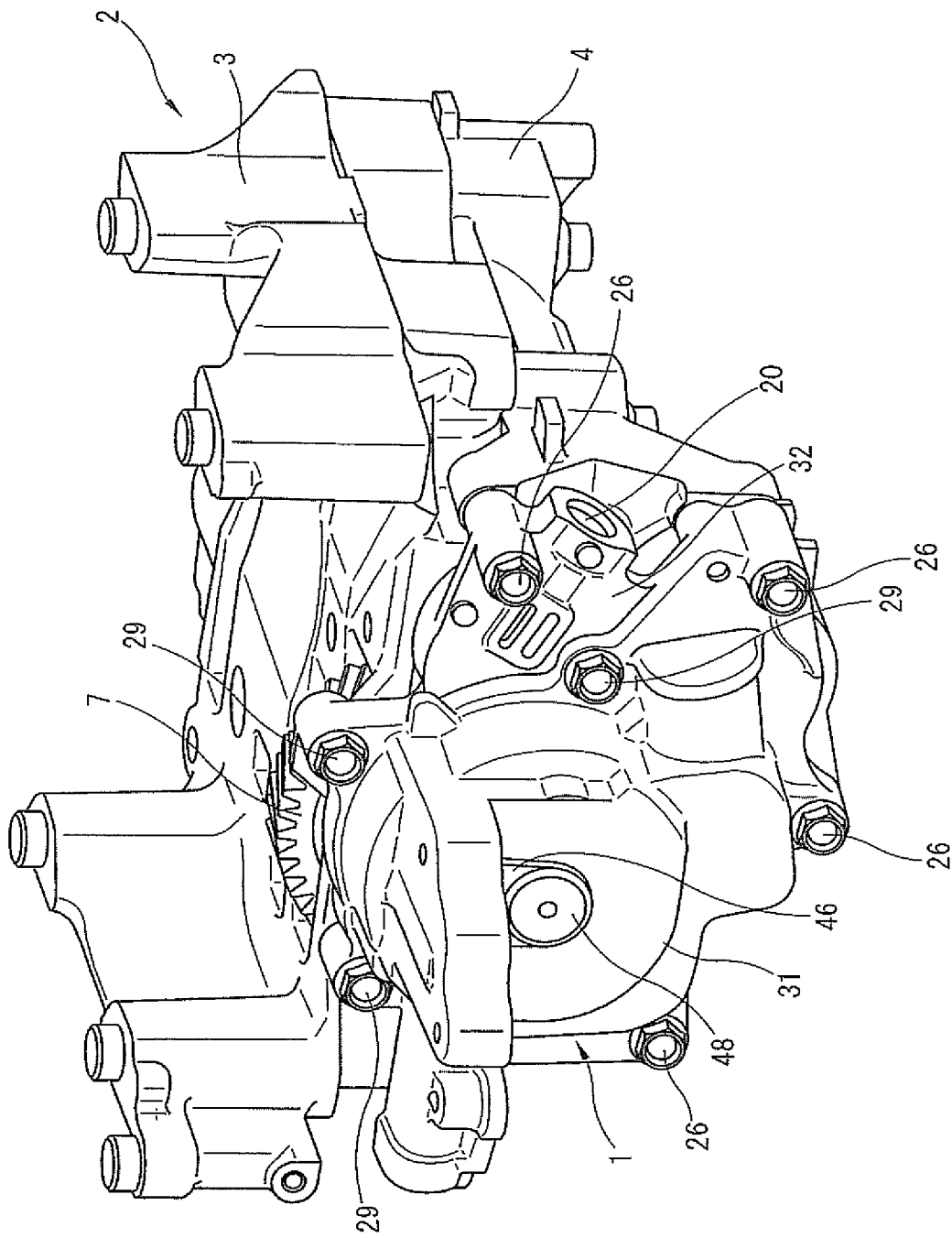
FIG. 1 is a perspective view showing a state in which an oil pump, as a variable displacement pump, according to an embodiment of the present invention is fixed to a balancer device.
Figure 2:
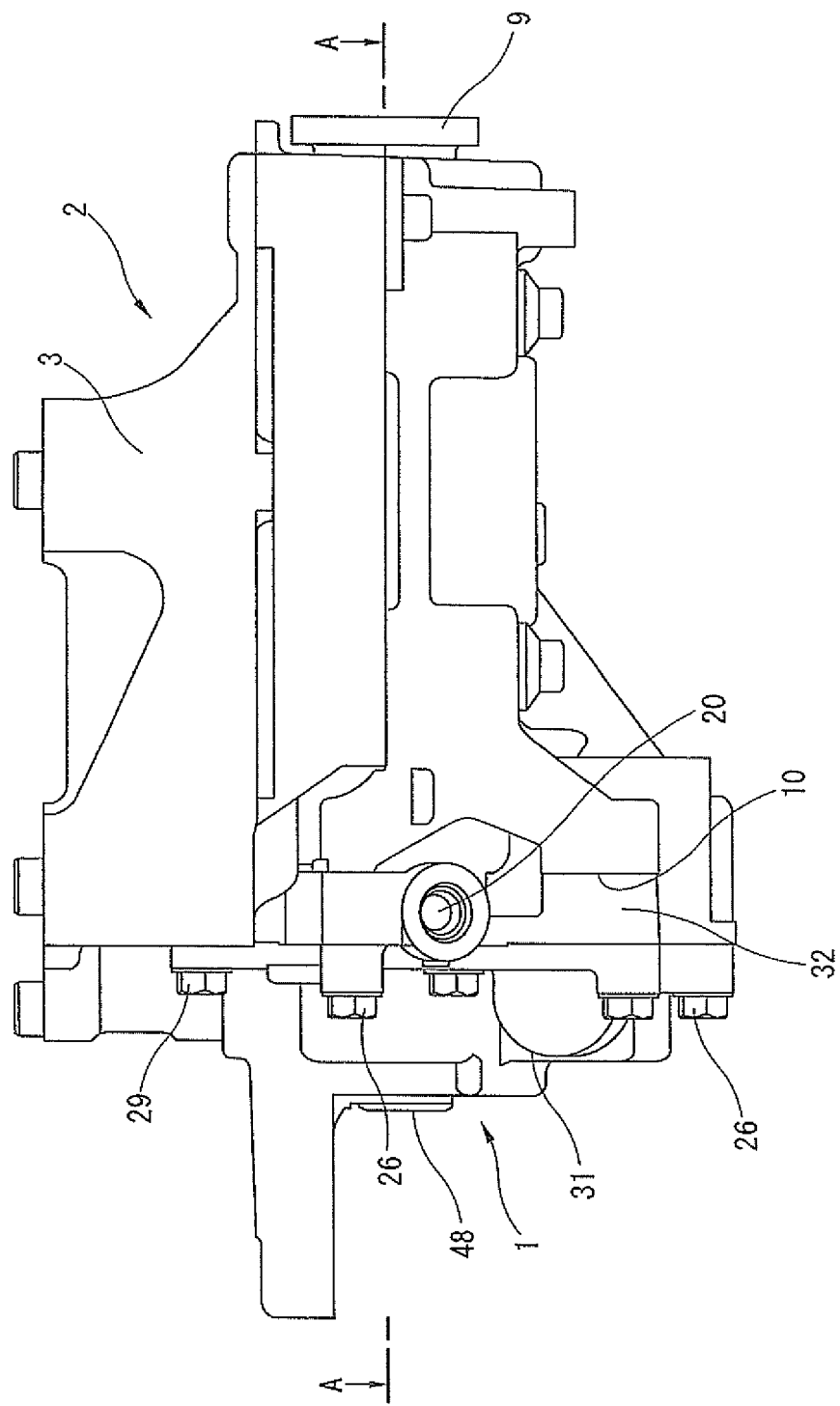
FIG. 2 is a side view showing the state in which the oil pump is fixed to the balancer device.
Figure 3:
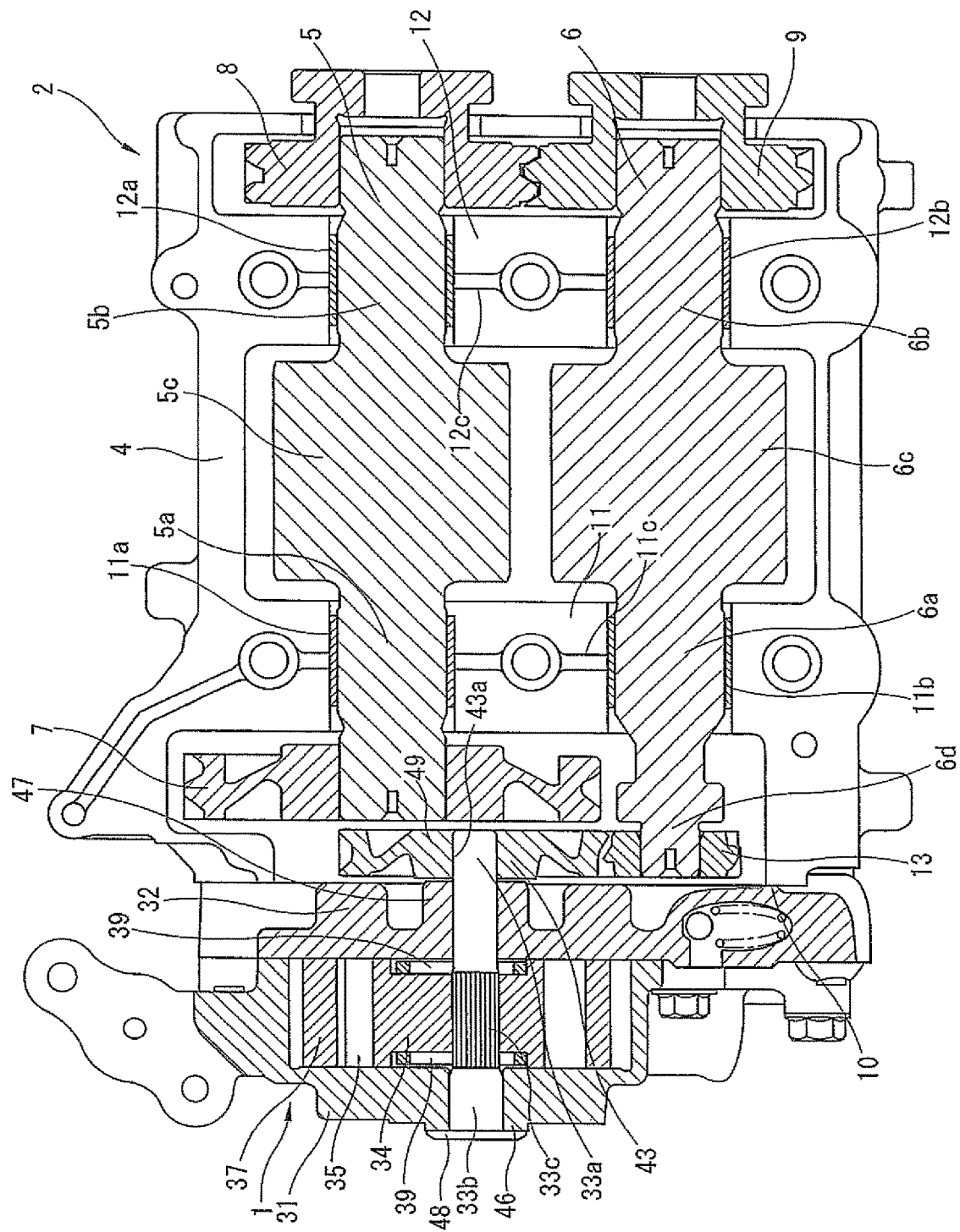
FIG. 3 is a sectional view taken along a line A-A of FIG. 2.

FIG. 1 is a perspective view showing a state in which the oil pump according to the present embodiment is fixed to a balancer device. FIG. 2 is a side view of the oil pump and the balancer device. FIG. 3 is a sectional view taken along a line A-A of FIG. 2.

An oil pump 1 is fixed to a balancer device 2 provided in an oil pan of an internal combustion engine (not shown), and is driven with a rotation force transmitted from the balancer device 2.

As shown in FIGS. 1 to 3, the balancer device 2 is fixed to the oil pan side of a cylinder block of the internal combustion engine with a plurality of fixing members (in the present embodiment, four fixing members) such as fixing bolts. This balancer device 2 has an upper housing 3 and a lower housing 4 connected to an oil pan bottom side of the upper housing 3 with a plurality of connecting members such as connecting bolts. These upper and lower housings 3 and 4 are molded in aluminum alloy material as metal material. A drive shaft 5 and a driven shaft 6, which are a pair of balancer shafts arranged parallel to each other, are rotatably supported in an accommodation section formed between the both housings 3 and 4. At one end portion in a rotation axis direction of the drive shaft 5, a helical type drive gear 7, as a third power transmission member to which a rotation force is transmitted by engaging with a drive helical gear that is driven and rotated by a crankshaft (not shown), is provided.

Further, a drive gear 8, as a helical type fourth power transmission member, is fixed to the other end side in the rotation axis direction of the drive shaft 5 so as to be able to rotate integrally with the drive shaft 5. Moreover, a driven gear 9, as a helical type fifth power transmission member to which the rotation force is transmitted by engaging with the drive gear 8, is fixed to the driven shaft 6.

A balancer housing is formed by these upper housing 3 and lower housing 4.

The lower housing 4 is formed into a rectangular box shape that is substantially same as the upper housing 3. One end surface of the lower housing 4 is a fixing surface 10 to which the oil pump 1 is fixed.

The entire fixing surface 10 is formed into a flat shape. The fixing surface 10 is provided, at side portions thereof, with a plurality female screw holes (in the present embodiment, four female screw holes) (not shown). Further, the fixing surface 10 is provided with an after-mentioned opening end of a main oil gallery to supply oil (lubricating oil) discharged from the oil pump 1 to each sliding part of the internal combustion engine.

As shown in FIG. 3, the drive shaft 5 is supported at journal portions 5a and 5b located at both end sides in the rotation axis direction by plain bearings 11a and 12a provided between the upper housing 3 and the lower housing 4.

The rotation force of the crankshaft is transmitted to the drive shaft 5 by the drive gear 7 provided at the one end portion of the drive shaft 5 being engaged with the drive helical gear (not shown). In this manner, when the drive shaft 5 is rotated, the drive shaft 5 and the driven shaft 6 rotate in opposite directions to each other at double the rotation speed of the crankshaft with the rotation of the drive shaft 5 transmitted from the drive gear 8 fixed to the other end side of the drive shaft 5 to the driven shaft 6 through the driven gear 9 fixed to the driven shaft 6.

Further, a counter weight 5c is formed integrally with the drive shaft 5 in the rotation axis direction between the pair of journal portions 5a and 5b.

In the same manner as the drive shaft 5, the driven shaft 6 is supported at a pair of journal portions 6a and 6b formed at both end sides in a rotation axis direction by two plain bearings 11b and 12b provided between the upper housing 3 and the lower housing 4. Further, a counter weight 6c is formed integrally with the driven shaft 6 in the rotation axis direction between the pair of journal portions 6a and 6b.

Each of the plain bearings 11a, 12a, 11b and 12b is placed in arc-shaped bearing grooves formed on opposing surfaces of a pair of partition walls 11 and 12 provided between the upper housing 3 and the lower housing 4. On the opposing surfaces of the partition walls 11 and 12, passage grooves 11c and 12c to supply the lubricating oil to the plain bearings 11a, 12a, 11b and 12b are formed.

Further, a drive side helical gear 13, as a first power transmission member (an external gear) whose diameter is smaller than that of the driven gear 9, is fixed to one end portion 6d in the rotation axis direction of the driven shaft 6. This drive side helical gear 13 drives the oil pump 1.

Figure 4:
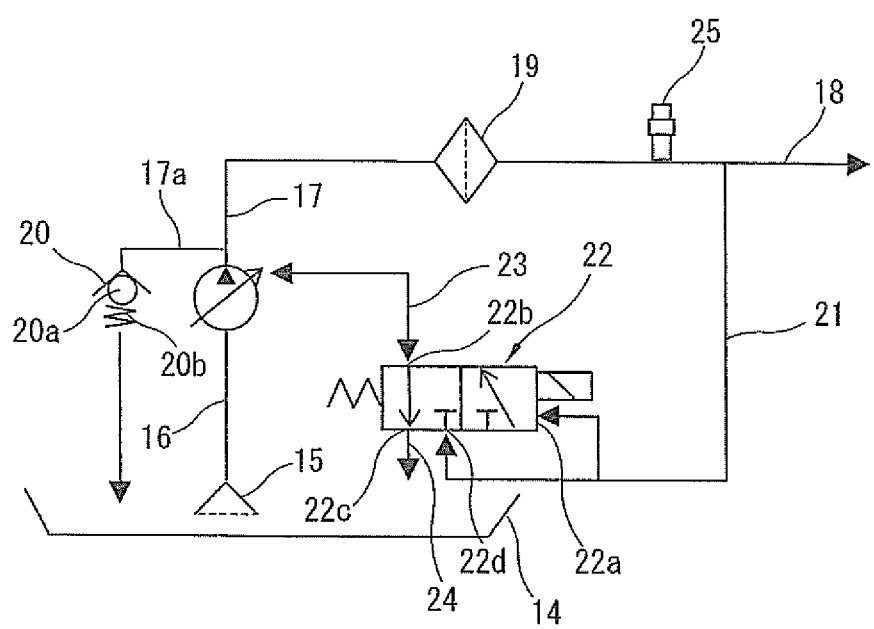
FIG. 4 is a hydraulic circuit of the oil pump according to the embodiment.

FIG. 4 shows a hydraulic circuit of the oil pump 1.

First, the hydraulic circuit of the oil pump 1 will be explained with reference to FIG. 4. The oil pump 1 is driven by a rotation driving force transmitted from the driven shaft 6, and pumps up the oil stored in an oil pan 14 from an inlet passage 16 through a strainer 15. The oil pumped up from the inlet passage 16 is pressurized by pump elements, and is discharged to a main oil gallery 18 formed in the internal combustion engine from an outlet passage 17 that is an outlet portion.

The main oil gallery 18 is configured to supply the oil to an oil jet injecting a cooling oil to a piston that is a sliding part of the internal combustion engine, a valve timing control device, a bearing of the crankshaft and so on.

At a downstream side of the outlet passage 17, an oil filter 19 that collects foreign substances existing in the flowing oil and send the oil to the main oil gallery 18 is provided. Further, a pressure control valve 20 that suppresses breakage of the oil filter 19 when a discharge pressure becomes excessive is provided. This pressure control valve 20 is formed, as shown in FIGS. 4 and 5, by a ball valve body 20a that opens and closes an opening end of a branch passage 17a that branches off from the outlet passage 17, a coil spring 20b that forces the ball valve body 20a in a closing direction and an annular spring retainer 20c.

Further, a supply passage 21 that supplies the oil to an after-mentioned control hydraulic chamber 45 through an electromagnetic switching valve 22 is formed so as to branch off from the main oil gallery 18.

A supply and exhaust passage 23 that introduces an oil pressure of the main oil gallery 18 into the control hydraulic chamber 45 through the supply passage 21 or exhausts an oil pressure of the control hydraulic chamber 45 into the oil pan 14 is connected to the electromagnetic switching valve 22. The electromagnetic switching valve 22 has a pilot port 22a communicating with a pilot passage 21a that branches off from the supply passage 21, a supply and exhaust port 22b communicating with the supply and exhaust passage 23, a drain port 22c connecting the supply and exhaust passage 23 and an exhaust passage 24 and a supply port 22d communicating with the supply passage 21. The exhaust passage 24 communicates with the oil pan 14.

Figure 5:
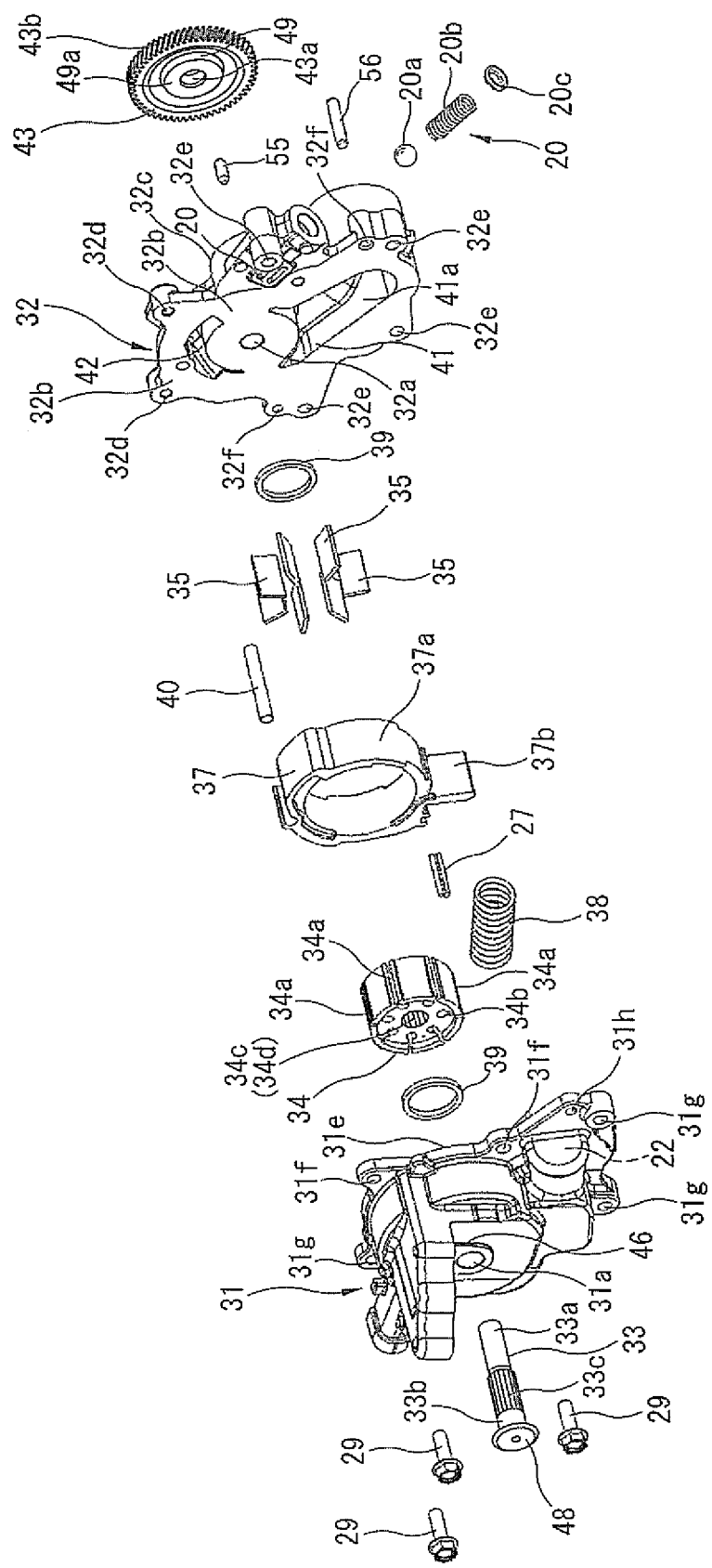
FIG. 5 is a perspective exploded view of the oil pump according to the embodiment.
Figure 6:
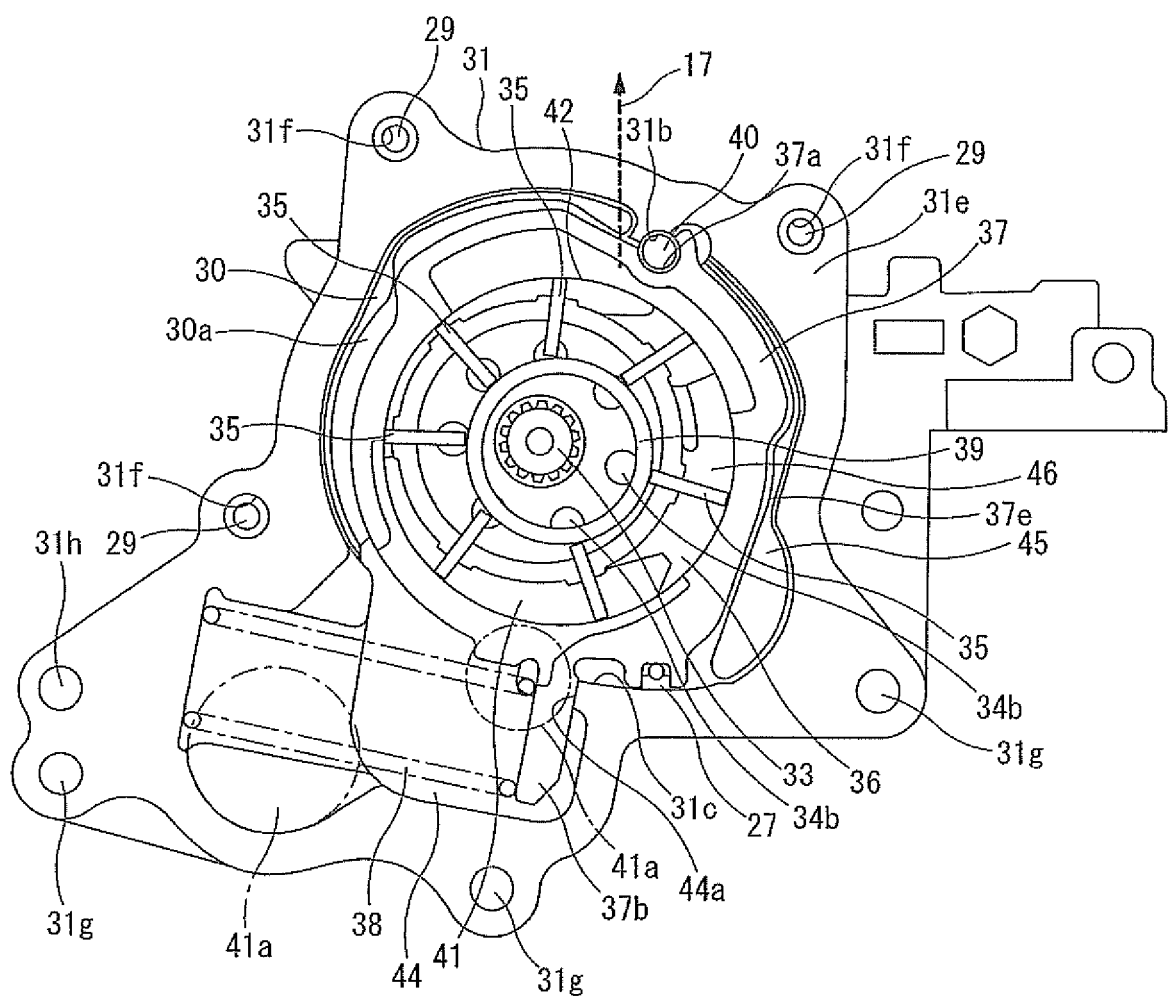
FIG. 6 is a front view of the oil pump according to the embodiment with a cover member removed.
Figure 7:
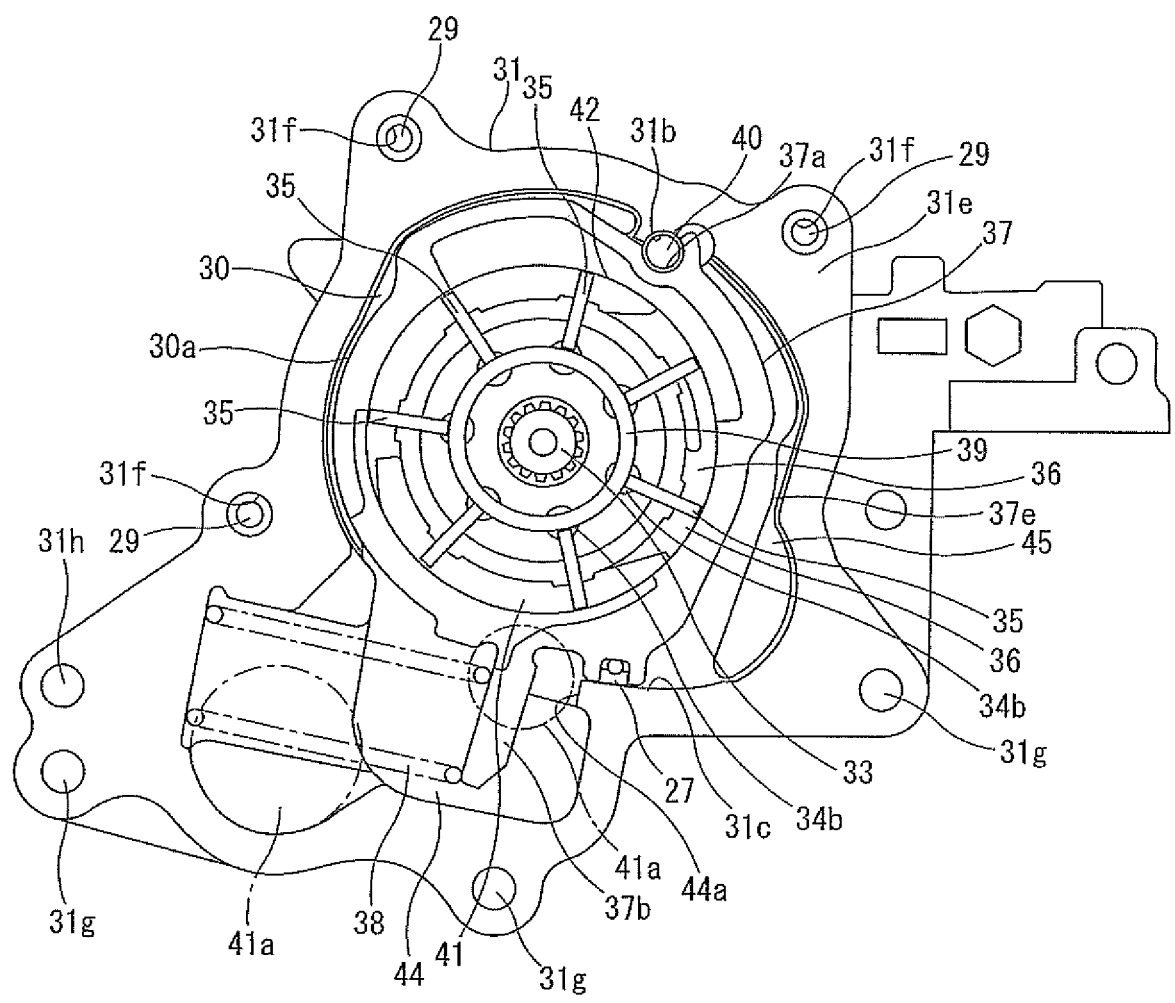
FIG. 7 is a front view showing an operation of the oil pump according to the embodiment with the cover member removed.

FIG. 5 is a perspective exploded view of the oil pump with components of the oil pump dismantled. FIG. 6 is a front view of the oil pump with a cover member removed. FIG. 7 is a drawing for explaining an operation of the oil pump.

The oil pump 1 has a structure as shown in FIGS. 1 and 5 to 7. The balancer device 2 is provided, at the one end surface thereof, with the plurality of female screw holes. A pump housing is fixed to the balancer device 2 with a plurality of bolts 26 (in the present embodiment, four bolts) as fixing members, which are screwed into the respective female screw holes.

This pump housing is formed by a housing body 31 and a cover member 32. One end side of the housing body 31 is open, and a pump accommodation chamber 30 having a square bracket shape in a longitudinal cross section, as a pump accommodating section, is formed in the housing body 31. The cover member 32 is connected to the housing body 31 so as to cover an opening of the housing body 31. The cover member 32 is formed so as to be thinner than the housing body 31.

The oil pump 1 has a pump shaft 33, a rotor 34 and vanes 35. The pump shaft 33 is set at a substantially center portion of the pump accommodation chamber 30, and is rotatably supported by the housing body 31 and the cover member 32 with both end portions in a rotation axis direction of the pump shaft 33 penetrating the housing body 31 and the cover member 32 respectively. The rotor 34 is rotatably accommodated in the pump accommodation chamber 30. The rotor 34 is connected to the pump shaft 33 with its center portion fitted on or engaged with the pump shaft 33 by spline engagement. Here, the rotor 34 and the pump shaft 33 are configured so that a rotation force from the pump shaft 33 is transmitted to the rotor 34 while allowing a relative movement of the rotor 34 and the pump shaft 33. The vanes 35 are accommodated in a plurality of slots 34a (in the present embodiment, seven slots), which are radially formed at an outer circumferential portion of the rotor 34 by being cut radially, so as to be able to extend from and retract into the slots 34a.

The oil pump 1 further has a cam ring 37, a coil spring 38 as a forcing member and vane rings 39 and 39. The cam ring 37 is formed into a ring shape having a circular hole in its inner circumference. This hole of the cam ring 37 is formed so as to contact an outer peripheral side of each vane 35. Further, the cam ring 37 is set so as to be able to rock. By this rocking movement of the cam ring 37, an eccentric amount of the hole of the cam ring 37 with respect to a rotation center of the rotor 34 can be changed. A plurality of pump chambers 36 are formed by an inner circumferential surface of the hole of the cam ring 37, an outer circumferential surface of the rotor 34 and the adjacent two vanes 35 and 35.

Here, the movement of the cam ring 37 is not limited to the rocking movement, but could be a linear movement. The coil spring 38 is accommodated in the housing body 31, and always forces the cam ring 37 in a direction in which the eccentric amount of a center of the hole of the cam ring 37 with respect to the rotation center of the rotor 34 is increased.

The pair of vane rings 39 and 39 have a smaller diameter than that of the rotor 34. These vane rings 39 and 39 are slidably set at both side portions in an inner circumferential side of the rotor 34.

More specifically, the vane rings 39 and 39 are set so that an edge, in the inner circumferential side of the rotor 34, of each vane 35 accommodated in the slot 34a of the rotor 34 contacts the vane rings 39 and 39. With this configuration, a distance between the inner circumferential surface of the hole of the cam ring 37 and outer circumferential surfaces of the vane rings 39 and 39 is constant, then the center of the hole of the cam ring 37 and a center of each of the vane rings 39 and 39 are always identical with each other.

The cam ring 37, the pump shaft 33, the rotor 34 and the vanes 35 form the pump elements.

The housing body 31 is formed as a single-piece body with aluminum alloy material as metal material. As shown in FIGS. 5 and 6, the housing body 31 has, at a substantially middle position on a bottom surface 30a of the pump accommodation chamber 30, a first bearing hole 31a that penetrates the bottom surface 30a and rotatably supports one end portion of the pump shaft 33. The housing body 31 also has, on the bottom surface 30a of the pump accommodation chamber 30, which is an inner side surface of the housing body 31, a pivot pin hole into which a pivot pin 40 is inserted. In addition, a supporting groove 31b is formed on an inner circumferential wall of the pump accommodation chamber 30 so as to extend in an axis direction of the pivot pin 40.

Further, as shown in FIG. 6, a seal sliding contact surface 31c is formed on the inner circumferential wall of the pump accommodation chamber 30. An after-mentioned seal member 27 provided at an outer circumferential portion of the cam ring 37 slides on this seal sliding contact surface 31c.

The housing body 31 is provided, on a flat fixing surface 31e formed at an outer peripheral side of the opening of the pump accommodation chamber 30, with a plurality of bolt insertion holes 31f (in the present embodiment, three bolt insertion holes) through boss portions. Bolts 29 are inserted into these bolt insertion holes 31f, and the housing body 31 and the cover member 32 are connected to each other.

The housing body 31 is further provided with three bolt insertion holes 31g which penetrate the fixing surface 31e and into which three of four bolts 26 are inserted. Moreover, the housing body 31 is provided, at a lower side thereof, with a positioning hole 31h which penetrates the fixing surface 31e and into which a positioning pin 56 for making positioning with respect to the balancer device 2 together with the cover member 32 is inserted.

Figure 8:
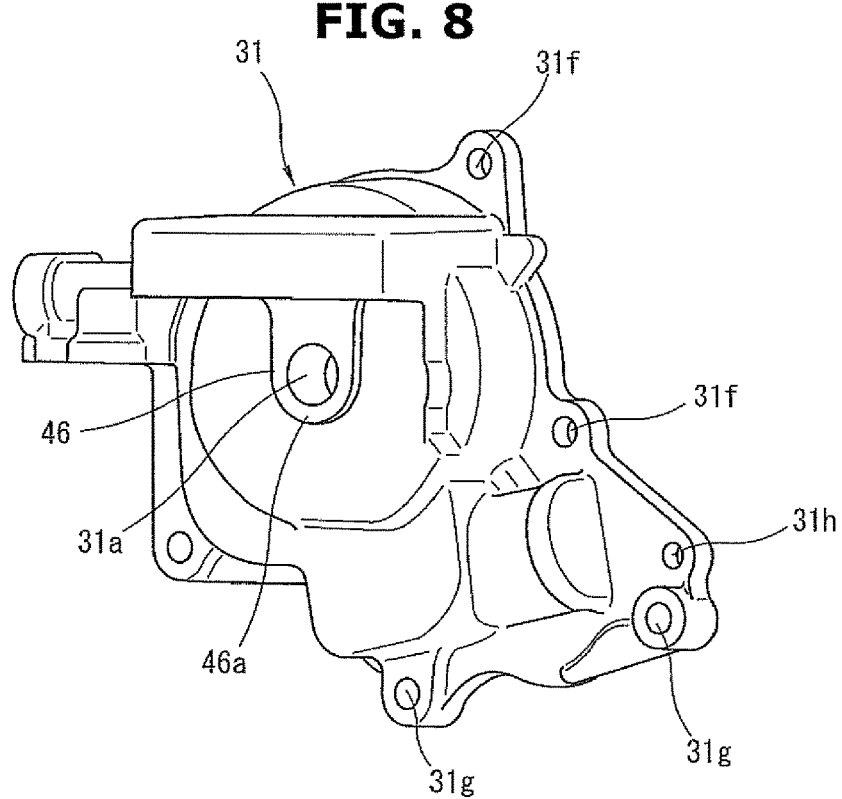
FIG. 8 is a perspective view showing a housing body according to the embodiment.
Figure 9:
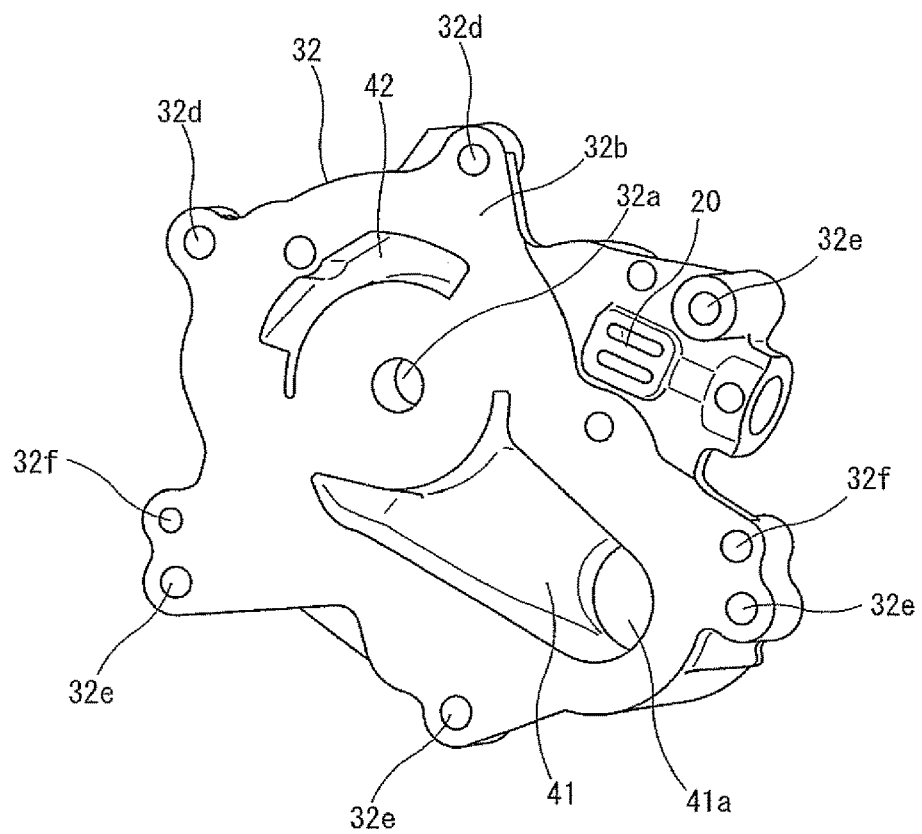
FIG. 9 is a back view of the cover member according to the embodiment.
Figure 10:
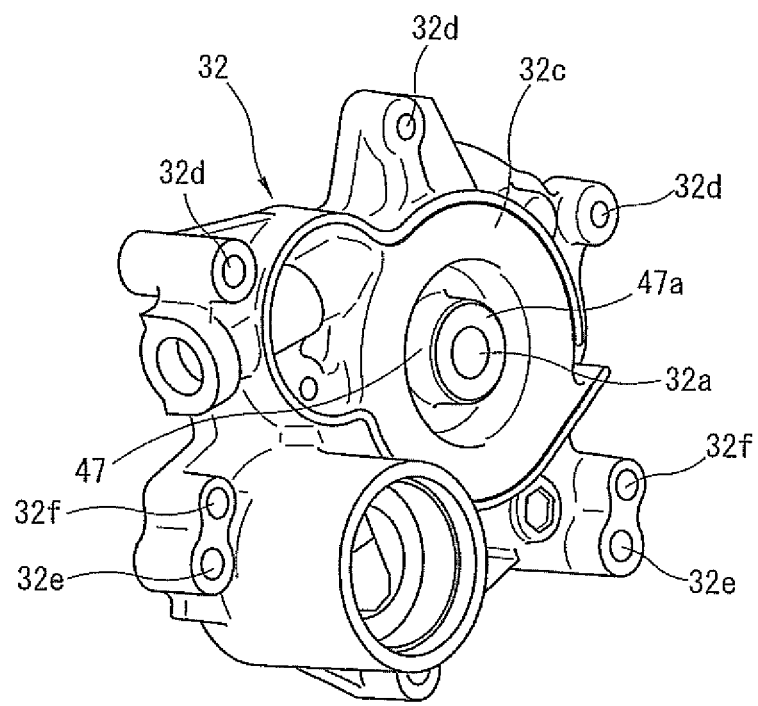
FIG. 10 is a perspective view of the cover member according to the embodiment.

FIG. 8 is a perspective view of the housing body 31, viewed from one side. FIG. 9 is a perspective view of the cover member 32, viewed from one side. FIG. 10 is a perspective view of the cover member 32, viewed from the other side.

As shown in FIGS. 5 and 8, a second thrust receiving portion 46 is formed integrally with the housing body 31 at an outer circumferential side of an outer side hole edge of the first bearing hole 31a. This second thrust receiving portion 46 is structured so that an after-mentioned second thrust restraining portion (or a second thrust limiting portion) 48 of the pump shaft 33 can contact the second thrust receiving portion 46 from the axis direction of the pump shaft 33. Further, the second thrust receiving portion 46 is formed so as to swell from an outer surface of the housing body 31, and has a uniform thickness from the outer surface of the housing body 31. An outside shape of the second thrust receiving portion 46 is a U-shape that extends to one side from an outer circumference of the first bearing hole 31a. The second thrust receiving portion 46 has a second receiving surface 46a whose entire surface is a flat surface.

As shown in FIGS. 4, 9 and 10, the cover member 32 is formed into a thinner flat plate shape than the housing body 31 with aluminum alloy material as metal material. The cover member 32 has, at positions facing or corresponding to the first bearing hole 31a, a second bearing hole 32a that penetrates the cover member 32 and rotatably supports the other end portion in the axis direction of the pump shaft 33. The cover member 32 also has an inner end side housing fixing surface 32b that is fixed to the housing body 31 side and an outer end side balancer fixing surface 32c that contacts the fixing surface 10 of the balancer device 2 and is fixed to the fixing surface 10 of the balancer device 2.

The cover member 32 is provided, at an outer peripheral portion thereof, with three female screw holes 32d to which the three bolts 29, inserted into the three bolt insertion holes 31f of the housing body 31, are fixed. The cover member 32 is further provided with four bolt insertion holes 32e which penetrate the cover member 32 and to which four bolts 26 are inserted.

In addition, as shown in FIG. 5, the cover member 32 is provided, at positions correspond to the positioning hole 31h of the housing body 31 and a positioning hole (not shown)

formed at the balancer housing of the balancer device 2, with two positioning holes 32f which penetrate the cover member 32 and to which pins 55 and 56 are inserted.

As shown in FIG. 10, on the balancer fixing surface 32c side of the cover member 32, a first thrust receiving portion 47 is formed at an outer circumference of a hole edge of the second bearing hole 32a of the cover member 32. This first thrust receiving portion 47 is shaped into a substantially cylinder that encircles an outer circumference of the second bearing hole 32a. The first thrust receiving portion 47 has a flat first receiving surface 47a.

As shown in FIGS. 6 and 7, the housing body 31 and the cover member 32 each have, at outer peripheral sides of the opposing fixing surfaces 31e and 32b, an inlet port 41 as an inlet portion and an outlet port 42 as an outlet portion. The inlet port 41 is formed into an arc-shaped recess so as to be open in a region (a suction region) where inside volumes of the pump chambers 36 increase by and according to the pump operation of the pump elements. On the other hand, the outlet port 42 is formed into an arc-shaped recess so as to be open in a region (a discharge region) where the inside volumes of the pump chambers 36 decrease by and according to the pump operation of the pump elements. The inlet port 41 and the outlet port 42 are arranged at substantially opposite positions to each other with respect to the second bearing hole 32a.

An inlet hole 41a penetrating a bottom wall of the cover member 32 and opening to the outside is formed at an after-mentioned spring accommodation chamber 44 side in the inlet port 41. With this structure, the lubricating oil in the oil pan 14 is sucked into each pump chamber 36 of the suction region through the inlet passage 16, the inlet hole 41a and the inlet port 41.

An outlet hole (not shown) penetrating a bottom wall of the housing body 31 and communicating with the main oil gallery 18 through the outlet passage 17 is formed and opens in the outlet port 42.

As shown in FIGS. 5 and 6, the rotor 34 has the plurality of slots 34a (in the present embodiment, the seven slots) formed radially from an inner center side toward a radial direction outer side. At an inner side base end portion of each slot 34a, a chamber (a back pressure chamber) 34b having a substantially circular shape in cross section is formed.

A movement of each vane 35 toward the inner circumferential side of the rotor 34 is limited or restrained by the vane rings 39 and 39. Therefore, the rotor 34 can move relative to the cam ring 37 and the vane rings 39 and 39 with each of the vanes 35 being in contact with the inner circumferential surface of the cam ring 37 and the outer circumferential surfaces of the vane rings 39 and 39.

The rotor 34 has, at the middle thereof, an insertion hole 34c which penetrates the rotor 34 and into which the pump shaft 33 is inserted. On an inner circumferential surface of this insertion hole 34c, spline grooves 34d are formed along the axis direction.

The cam ring 37 is formed, as a single-piece component, into a cylindrical shape by molding and sintering iron base metal. As shown in FIGS. 4 and 6, the cam ring 37 has an arc recessed pivot groove 37a at a position, facing or corresponding to the supporting groove 31b of the housing body 31, of the outer circumferential portion of the cam ring 37. This pivot groove 37a supports the pivot pin 40 together with the supporting groove 31b, and forms a rocking fulcrum of the cam ring 37. The cam ring 37 further has, at a position substantially opposite to the pivot groove 37a with respect to the center of the cam ring 37, an arm portion 37b that protrudes in the radial direction and works together with the coil spring 38.

Here, in the housing body 31, the spring accommodation chamber 44 is provided so as to communicate with the pump accommodation chamber 30 through the inlet hole 41a. The coil spring 38 is accommodated as the forcing member in this spring accommodation chamber 44.

The coil spring 38 is elastically held between the arm portion 37b extending up to an inside of the spring accommodation chamber 44 and a bottom surface of the spring accommodation chamber 44 with a set load W given to the coil spring 38.

Therefore, the coil spring 38 always forces the cam ring 37 in the direction in which the eccentric amount of the cam ring 37 with respect to the rotation center of the rotor 34 is increased (i.e. in a counterclockwise direction in FIG. 6) through the arm portion 37b by an elastic force based on the set load W. With this, the cam ring 37 is in a state in which an outer surface of the arm portion 37b is pressed against a stopper surface 44a that is formed on a wall surface of the spring accommodation chamber 44 by a spring force of the coil spring 38. In this state, the cam ring 37 is maintained at a position at which the eccentric amount of the cam ring 37 with respect to the rotation center of the rotor 34 is a maximum.

At the outer circumferential portion of the cam ring 37, a seal holding groove having U-shape in cross section is formed so as to face the seal sliding contact surface 31c of the housing body 31. The seal member 27 is accommodated and held in this seal holding groove. This seal member 27 is made of, for instance, fluorocarbon polymers having low friction property, and has a linear long narrow shape along the axis direction of the cam ring 37. Further, a rubber member having an elastic force is provided at a bottom in the seal holding groove. The seal member 27 is pressed against the seal sliding contact surface 31c by this rubber member. With this structure, a good liquid-tightness of the after-mentioned control hydraulic chamber 45 is ensured.

As shown in FIG. 3, a driven side helical gear 43, as a second power transmission member (a driven gear) that is engaged with the drive side helical gear 13, is press-fitted onto one end portion 33a, protruding from the second bearing hole 32a, in the axis direction of the pump shaft 33. Then, the rotation force of the driven shaft 6 is transmitted to the pump shaft 33 through the both helical gears 13 and 43. The rotor 34 is rotated in the counterclockwise direction in FIG. 6 by this rotation force of the pump shaft 33.

The pump shaft 33 is set so that a rotation speed of the pump shaft 33 is the same as the rotation-speed (the number of revolutions) of the crankshaft by a speed reduction ratio between the drive side helical gear 13 and the driven side helical gear 43.

Figure 11:
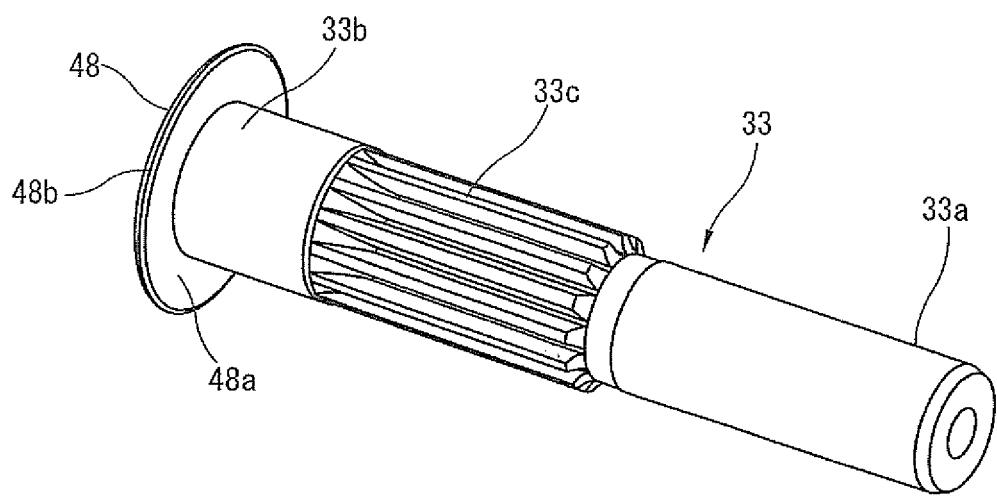
FIG. 11 is a perspective view of a pump shaft according to the embodiment.

As shown in FIG. 11, the pump shaft 33 is formed so that a diameter of the one end portion 33a side with respect to a substantially middle in the rotation axis direction of the pump shaft 33 is smaller than that of the other end portion 33b side. Spline ridge portions 33c that are engaged with the spline grooves 34d of the insertion hole 34c of the rotor 34 are formed at a part in the axis direction on an outer periphery of the other end portion 33b side. These spline ridge portions 33c and spline grooves 34d are engaged with each other with a slight gap (or a slight clearance) given between each spline ridge portion 33c and each spline groove 34d so that the rotor 34 can move relative to the pump shaft 33 in the axis direction by this slight gap (this slight clearance).

One of the reason why the rotor 34 is configured to be able to move in the axis direction in this way is because an occurrence of a press-fitting stress of a case where the pump shaft 33 is press-fitted into the rotor 34 is eliminated. That is, if the press-fitting stress occurs in the case where the small-sized rotor 34 is used, there is a risk that the slot 34*a* will expand or widen by an oil pressure which the vane 35 receives during rotation of the rotor 34. In contrast to this, the present embodiment can overcome this drawback.

Further, when the rotor 34 is configured to be able to move in the axis direction of the pump shaft 33, even if a thrust force acts on the pump shaft 33, this configuration can eliminate a situation in which the rotor 34 slides with a side surface of the rotor 34 and an inner surface of the pump accommodation chamber 30 contacting each other with a strong force. Hence, a rotation load of the pump shaft 33 can be reduced.

Figure 12:
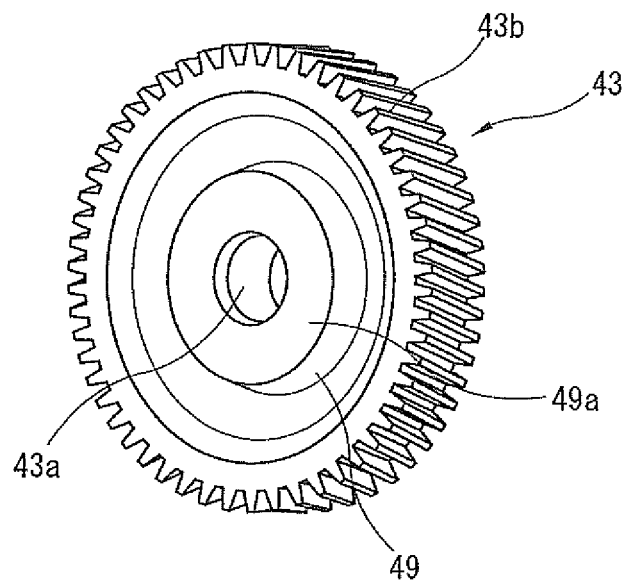
FIG. 12 is a perspective view of a driven side helical gear according to the embodiment.

FIG. 12 is a perspective view of the driven side helical gear 43. The driven side helical gear 43 has, at the middle thereof, a shaft insertion hole 43*a* which penetrates the driven side helical gear 43 and to which the one end portion 33*a* of the pump shaft 33 is press-fixed. The driven side helical gear 43 further has, at an outer circumference thereof, a plurality of helical teeth 43*b* having a predetermined inclination angle and engaging with helical teeth of the drive side helical gear 13.

In addition, an annular first thrust restraining portion (or an annular first thrust limiting portion) 49 located so as to face the first receiving surface 47*a* of the first thrust receiving portion 47 in the axis direction is formed integrally with an inner circumferential portion, on the cover member 32 side, of the driven side helical gear 43. This first thrust limiting portion 49 is formed by cutting out an inner side of the helical teeth 43*b*, on the cover member 32 side, of the driven side helical gear 43 into an annular shape, and is shaped into an annular protrusion having a predetermined width at this inner circumferential side. The first thrust limiting portion 49 has a first restraining surface (or a first limiting surface) 49*a* having a flat top end so as to face and be able to contact the first receiving surface 47*a* of the first thrust receiving portion 47.

Moreover, as shown in FIG. 11, the second thrust restraining portion (or the second thrust limiting portion) 48 located so as to face the second thrust receiving portion 46 in the axis direction is formed integrally with an end edge of the other end portion 33*b*, in the axis direction, of the pump shaft 33. This second thrust limiting portion 48 is formed into a thin flange shape, and its outside diameter is substantially same as that of an arc portion of the second thrust receiving portion 46. A flat second restraining surface (or a flat second limiting surface) 48*a* of the pump shaft 33 side can contact the second receiving surface 46*a*, on the arc portion side, of the second thrust receiving portion 46 from the axis direction. An outer circumferential portion 48*b* of the second thrust limiting portion 48 is formed into a tapered surface.

The aforementioned control hydraulic chamber 45 is provided in an outer circumferential region between the pivot groove 37*a* of the cam ring 37 and the seal member 27, as shown in FIG. 6. This control hydraulic chamber 45 is partitioned or defined by an inner circumferential surface of the housing body 31, an outer circumferential surface of the cam ring 37, the pivot pin 40 and the seal member 27.

The control hydraulic chamber 45 communicates with the supply passage 21 through the supply and exhaust passage 23 and the electromagnetic switching valve 22. Therefore, the control hydraulic chamber 45 is supplied with the oil pressure from the main oil gallery 18 through the supply passage 21, the electromagnetic switching valve 22 and the supply and exhaust passage 23. And also, an internal oil pressure of the control hydraulic chamber 45 is discharged through the supply and exhaust passage 23 and the electromagnetic switching valve 22.

The outer circumferential surface, facing the control hydraulic chamber 45, of the cam ring 37 is formed as a pressure receiving surface 37*e*. By the oil pressure from the supply passage 21 which this pressure receiving surface 37*e* receives, a rocking force (a movement force) in a direction in which the eccentric amount of the cam ring 37 with respect to the rotation center of the rotor 34 is decreased (i.e. in a clockwise direction in FIG. 6) is provided to the cam ring 37 against the urging force of the coil spring 38.

That is, the control hydraulic chamber 45 is configured so that the internal oil pressure of the control hydraulic chamber 45 forces the cam ring 37 through the pressure receiving surface 37*e* in a direction in which the center of the cam ring 37 gets close to the rotation center of the rotor 34 so as to be a concentric circle. That is, by exerting the internal oil pressure on the cam ring 37 in the direction in which the eccentric amount of the cam ring 37 with respect to the rotation center of the rotor 34 is decreased, a moving amount control (a rocking amount control) in a concentric direction of the cam ring 37 is performed.

Here, a rocking position of the cam ring 37 is determined by balance of a predetermined force relation between an urging force in an eccentric direction of the cam ring 37 by the urging force of the coil spring 38 and an urging force by the internal oil pressure of the control hydraulic chamber 45.

The electromagnetic switching valve 22 is a three-port two-position valve held in a holding portion provided at a lower end portion of the housing body 31.

That is, the electromagnetic switching valve 22 operates the three-direction valve provided in the electromagnetic switching valve 22 with the oil pressure supplied from the supply passage 21 being introduced through the pilot port 22*a* and used as a pilot pressure. In an initial state (at a predetermined pressure or lower), the control hydraulic chamber 45 communicates with the supply and exhaust port 22*b* through the supply and exhaust passage 23, and also communicates with the drain port 22*c* by the three-direction valve. When a pump rotation speed increases and the discharge pressure exceeds a predetermined pressure, the three-direction valve operates against a spring force. With this, the supply and exhaust port 22*b* is switched, and communicates with the supply port 22*d* and does not communicate with the drain port 22*c*. Therefore, the control hydraulic chamber 45 is supplied with the oil pressure from the main oil gallery 18.

Further, the electromagnetic switching valve 22 is configured to generate a solenoid thrust force in proportion to a duty ratio by pulse current from a control unit and exert the thrust force on the three-direction valve in the same direction as the pilot pressure.

That is, when there is no current application (i.e. duty ratio is zero) by stopping the pulse current to a coil of the electromagnetic switching valve 22 from the control unit, no solenoid thrust force occurs, and a setting pressure determined by the spring force arises.

With this, since the communication between the supply and exhaust passage 23 and the supply and exhaust port 22*b* is cut off and the supply and exhaust passage 23 communicates with the drain port 22*c* by the three-direction valve, the internal oil pressure of the control hydraulic chamber 45 is discharged, then the control hydraulic chamber 45 is in a low pressure state.

When a signal of the current application is outputted from the control unit to the coil of the electromagnetic switching valve 22 and a current application (the duty ratio) increases, the solenoid thrust force is increase by and according to this increase in the current application (the duty ratio), and the pilot pressure is assisted. Therefore, the three-direction valve operates against the spring force in the electromagnetic switching valve 22, and the supply and exhaust port 22b communicates with the supply port 22d and does not communicate with the drain port 22c. Thus, the electromagnetic switching valve 22 can operate at an oil pressure of the setting pressure or less of the spring force, and can constantly perform the control at a low oil pressure.

The internal oil pressure of the control hydraulic chamber 45 is therefore increased, and the cam ring 37 continuously moves (rocks) in the concentric direction against the spring force of the coil spring 38, then the pump discharge pressure is decreased.

The control unit controls operation of the electromagnetic switching valve 22 on the basis of an operating condition of the internal combustion engine such as an oil temperature and a water temperature in the engine, a rotation speed of the engine and a load of the engine and also an oil pressure information signal from an oil pressure sensor 25 provided at a downstream side of the oil filter 19 in the main oil gallery 18. That is, the electromagnetic switching valve 22 controls the oil pressure of the control hydraulic chamber 45 continuously and steplessly on the basis of the oil pressure information signal from the oil pressure sensor 25. With this control, fuel economy is increased.

[Operation of Oil Pump in the Present Embodiment]

Operation of the oil pump 1 (a variable displacement pump) according to the present embodiment will be briefly explained with reference to FIGS. 6 and 7.

In a low rotation operating condition such as an idling operation from an engine start, the drive shaft 5 of the balancer device 2 receives the rotation force of the crankshaft, and the driven shaft 6 is driven and rotated through the drive gear 8 and the driven gear 9. Then, the pump shaft 33 is driven and rotated through the drive side helical gear 13 of the driven shaft 6 and the driven side helical gear 43 of the pump shaft 33, and the oil pump 1 performs the pump operation by the pump elements. In this state, the coil of the electromagnetic switching valve 22 is in a no current application state. Therefore, in the electromagnetic switching valve 22, the supply and exhaust passage 23, the supply and exhaust port 22b and the drain port 22c are communicate with each other, but the supply port 22d is closed.

With this, the internal oil pressure of the control hydraulic chamber 45 becomes low. Therefore, as shown in FIG. 6, the cam ring 37 is maintained at a maximum eccentric amount position with respect to the rotation center of the rotor 34 by the spring force of the coil spring 38. That is, in a state of this engine rotation speed, discharge pressure characteristics of the oil pump are controlled so that the discharge pressure and a discharge flow amount are increased by and according to increase in the engine rotation speed.

Next, in an operating condition in which the engine rotation speed increases and the engine load and the oil temperature increase then an operation of the oil jet injecting the oil to the piston is required, the electromagnetic switching valve 22 is energized by the signal from the control unit. With this, an assist force is exerted on the pilot pressure, and the supply port 22d and the supply and exhaust port 22b communicate with each other by the three-direction valve, and the drain port 22c is closed.

Therefore, the oil pressure of the main oil gallery 18 is supplied into the control hydraulic chamber 45 through the supply passage 21, the electromagnetic switching valve 22 and the supply and exhaust passage 23, and the internal oil pressure of the control hydraulic chamber 45 is increased. The cam ring 37 continuously moves (rocks) from the maximum eccentric position with respect to the rotation center of the rotor 34 shown in FIG. 6 to a position shown in FIG. 7 by and according to the increase in the internal oil pressure of the control hydraulic chamber 45 against the spring force of the coil spring 38, and the eccentric amount of the cam ring 37 with respect to the rotation center of the rotor 34 is decreased. With this, the oil pump is controlled so that increase in the discharge pressure and the discharge flow amount by and according to the engine rotation speed is suppressed.

When the oil pump 1 rotates, the drive side helical gear 13 and the driven side helical gear 43 rotate while engaging with each other. During transmission of the rotation force, by or depending on the inclination angle of the engagement of the both helical gears, a thrust force (a load) in one direction acts on the pump shaft 33. Further, when a variable torque acts on the drive side helical gear 13, a thrust force (a load) in the other direction might act on the pump shaft 33. For this reason, there is a risk that support of the pump shaft 33 will be unstable then this will affect pump performance.

Further, in the case, like the above conventional technique, where the rotor 34 is press-fitted onto the pump shaft 33, the rotor 34 receives the thrust loads in the both directions. In this case, when the rotor 34 rotates while receiving the thrust loads, a facing inner surface of the housing body 31 and a facing inner surface of the cover member 32, which face to respective axial direction ends of the rotor 34, tend to wear. This could consequently cause oil leak from the pump chamber 36 at the outlet port 42 side to the pump chamber 36 at the inlet port 41 side.

Thus, in the present embodiment, the thrust loads in the one direction and in the other direction in the rotation axis direction, acting on the pump shaft 33, are received by the first thrust limiting portion 49 and the first thrust receiving portion 47 and also the second thrust limiting portion 48 and the second thrust receiving portion 46 respectively.

These workings or functions will be explained with reference to FIGS. 13 and 14.

Figure 13:
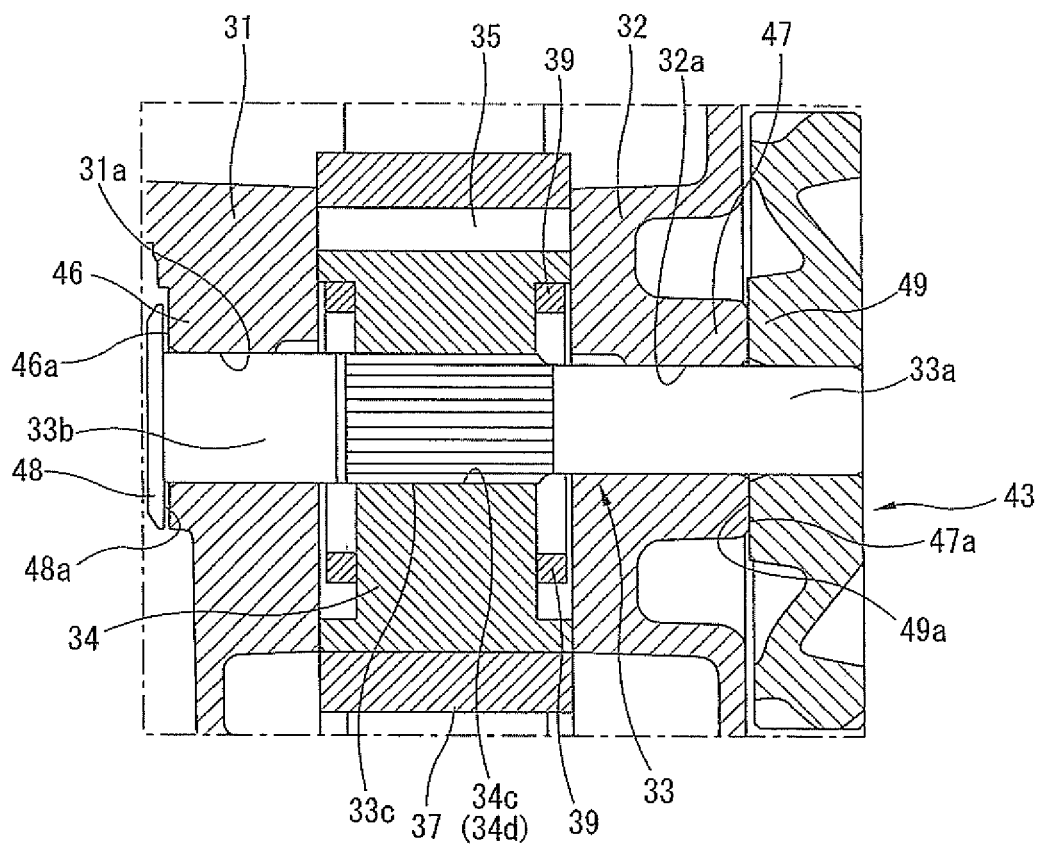
FIG. 13 is a sectional view of a principal part showing a state in which one thrust load acts on the pump shaft according to the embodiment.

First, when the thrust load in a left direction in FIG. 3 acts on the pump shaft 33, as shown in FIG. 13, the first limiting surface 49a of the first thrust limiting portion 49 of the driven side helical gear 43 contacts the first receiving surface 47a of the first thrust receiving portion 47 of the cover member 32 from the axis direction, and the first receiving surface 47a of the first thrust receiving portion 47 receives the left direction thrust load. Because of this, although the pump shaft 33 slightly moves in the left direction, a thrust movement of the pump shaft 33 more than this slight movement is limited.

At this time, the second limiting surface 48a of the second thrust limiting portion 48 of the pump shaft 33 slightly separates from the second receiving surface 46a of the second thrust receiving portion 46 of the housing body 31 in the axis direction, and a minute gap appears between these second limiting surface 48a and second receiving surface 46a.

Figure 14:
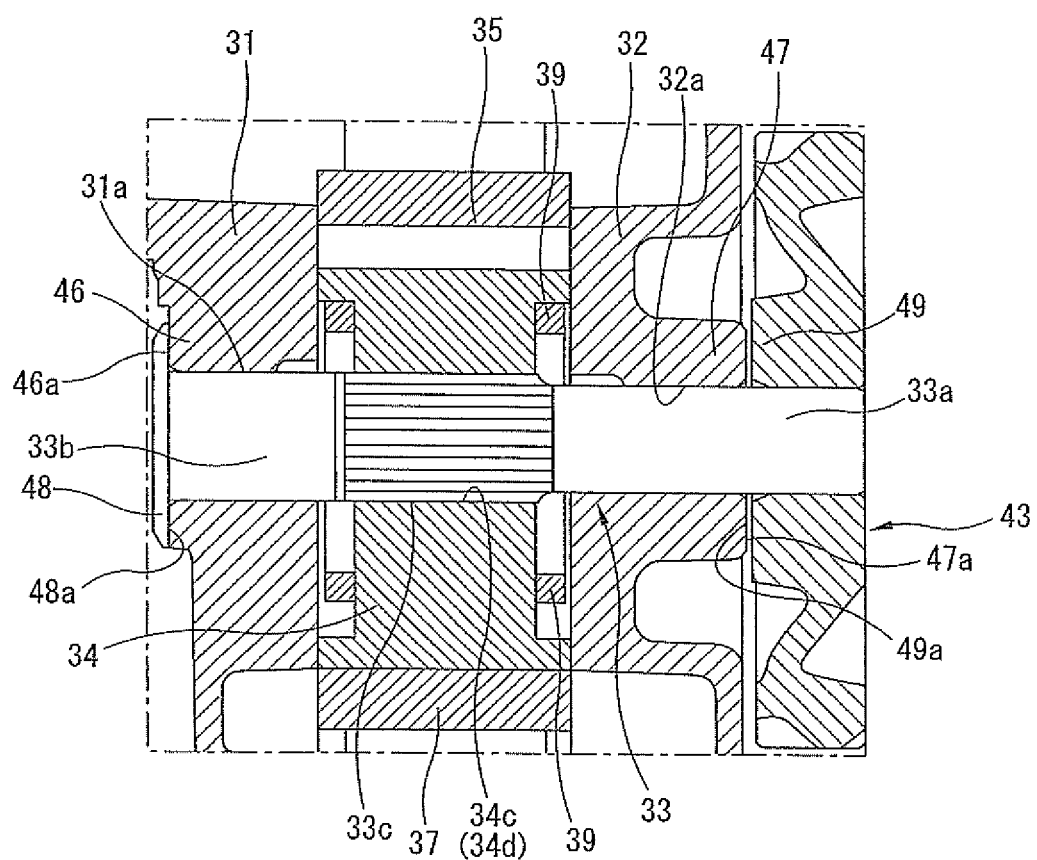
FIG. 14 is a sectional view of a principal part showing a state in which the other thrust load acts on the pump shaft according to the embodiment.

On the other hand, when the thrust load in a right direction in FIG. 3 acts on the pump shaft 33, as shown in FIG. 14, the second limiting surface 48a of the second thrust limiting portion 48 contacts the second receiving surface 46a of the second thrust receiving portion 46 of the housing body 31 from the axis direction, and the second receiving surface 46a of the second thrust receiving portion 46 receives the right direction thrust load. Because of this, although the pump shaft 33 slightly moves in the right direction, a thrust movement of the pump shaft 33 more than this slight movement is limited.

At this time, the first limiting surface 49a of the first thrust limiting portion 49 slightly separates from the first receiving surface 47a of the first thrust receiving portion 47 in the axis direction, and a minute gap appears between these first limiting surface 49a and first receiving surface 47a.

In this manner, in the present embodiment, the thrust receiving portions 46 and 47 effectively receive the right and left direction thrust loads acting on the pump shaft 33 by and according to the rotation of the helical gears 13 and 43 through the thrust limiting portions 48 and 49 respectively. Hence, even if the thrust force occurs due to variation in the rotation torque, the pump shaft 33 is stably supported by the bearing holes 31a and 32a. It is therefore possible to suppress degradation in the pump performance.

Further, as described above, the movement of the pump shaft 33 and the rotor 34 in trust directions is effectively limited.

When the thrust load due to the engagement of the drive side helical gear 13 and the driven side helical gear 43 occurs at the pump shaft 33, the first thrust limiting portion 49 presses the first thrust receiving portion 47. The cover member 32 is then pressed against the housing body 31 side.

Therefore, when the cover member 32 attempts to be deformed or distort to the driven side helical gear 43 side by an oil pressure of each pump chamber 36 in the outlet port 42 region where the oil pressure is high, this deformation or distortion of the cover member 32 to the driven side helical gear 43 side can be suppressed by the thrust load acting on the first thrust receiving portion 47 from the first thrust limiting portion 49.

As a result, oil leak from facing surfaces, facing to the cover member 32, of the pump chambers 36 can be reduced. This reduction in the oil leak can suppress the degradation in the pump performance of the oil pump 1.

On the other hand, in a case where the inclination of the gear of the drive side helical gear 13 and the driven side helical gear 43 is opposite, when the thrust load due to the engagement of these helical gears 13 and 43 occurs at the pump shaft 33, as shown in FIG. 14, the second limiting surface 48a of the second thrust limiting portion 48 contacts and presses the second receiving surface 46a of the second thrust receiving portion 46. These second limiting surface 48a and second receiving surface 46a then closely or absolutely contact each other, and have sealing performance between them. Oil leak from a gap between the pump shaft 33 and the first bearing hole 31a is therefore reduced, and this can suppress the degradation in the pump performance of the oil pump 1. This is effective especially in a high rotation speed type oil pump.

Here, in this state, if the variation in the rotation torque does not occur, as described above, the driven side helical gear 43 separates from the first thrust receiving portion 47 in the rotation axis direction, and the gap appears between the first limiting surface 49a and the first receiving surface 47a. Therefore, oil that leaks from a gap between the pump shaft 33 and the second bearing hole 32a flows into engagement portions between the driven side helical gear 43 and the drive side helical gear 13, thereby improving lubricating performance of these helical gears.

Further, as mentioned above, in the oil pump 1, the rotor 34 has the plurality of slots 34a and the plurality of back pressure chambers 34b for accommodating the plurality of vanes 35. Because of this, in the case, like the conventional manner, where the pump shaft 33 is press-fitted into the shaft insertion hole, a distance between an inner circumferential surface of each back pressure chamber 34b and an inner circumferential surface of the shaft insertion hole of the rotor 34 becomes short, then a margin of thickness for the press-fitting is small, which might reduce strength of the rotor 34. For this reason, in order to secure the strength of the rotor 34, it is required for the rotor 34 to have a large outside diameter. However, this necessarily causes increase in size of the oil pump 1.

In contrast to this, in the present embodiment, the rotor 34 is connected to the pump shaft 33 by the spline engagement so as to be able to move in the axis direction of the pump shaft 33. Therefore, there is no need to secure the margin of thickness like the conventional manner. This can reduce the size of the rotor 34 (the oil pump 1).

Further, since the driven side helical gear 43 is provided with the first limiting surface 49a, as compared with a case where the driven side helical gear 43 and the first limiting surface 49a are provided separately or individually, cost can be reduced.

Furthermore, in the present embodiment, since the first and second thrust limiting portions 49 and 48 and the first and second thrust receiving portions 47 and 46 are provided at both sides in the axis direction of the pump shaft 33 respectively with the pump elements such as the rotor 34 sandwiched between them, members on which the thrust loads act can be located apart from each other. This brings advantage of high strength.

In the present embodiment, since the vane pump is used to increase a pump discharge pressure as compared with, for instance, a trochoid pump, a pump cover (the cover member 32) has a tendency to be deformed or distort. In addition, since this pump cover (the cover member 32) is molded in aluminum alloy material, the pump cover (the cover member 32) tends to be deformed or distort.

However, even when such an oil pump is employed, if the inclination of the gear of the drive side helical gear and the driven side helical gear is set so that the thrust load acts on the cover member 32 side, an effect of suppressing leak of the oil from the pump cover can be magnified.

Further, if the inclination of the gear of the drive side helical gear and the driven side helical gear is set to be opposite, oil in the oil pump leaks from the second bearing hole 32a to the driven side helical gear 43 and the drive side helical gear 13, then a good lubricating performance can be obtained.

Second Embodiment

Figure 15:
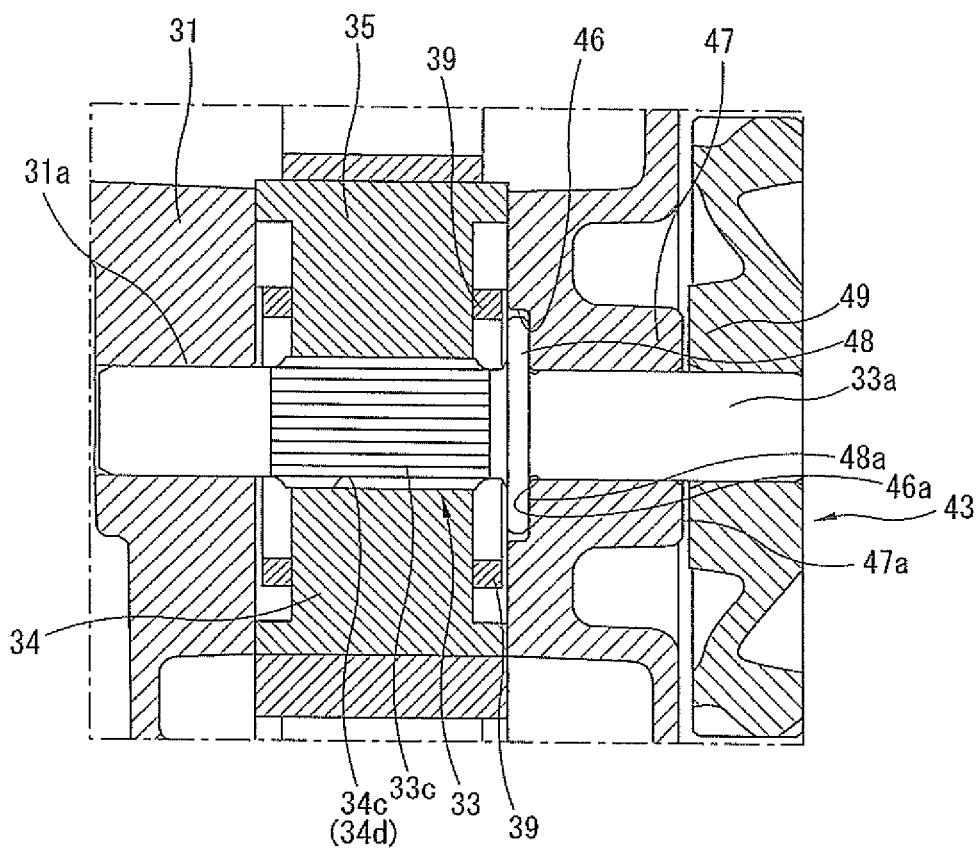
FIG. 15 is a sectional view of a principal part of the oil pump according to a second embodiment of the present invention.
Figure 16:
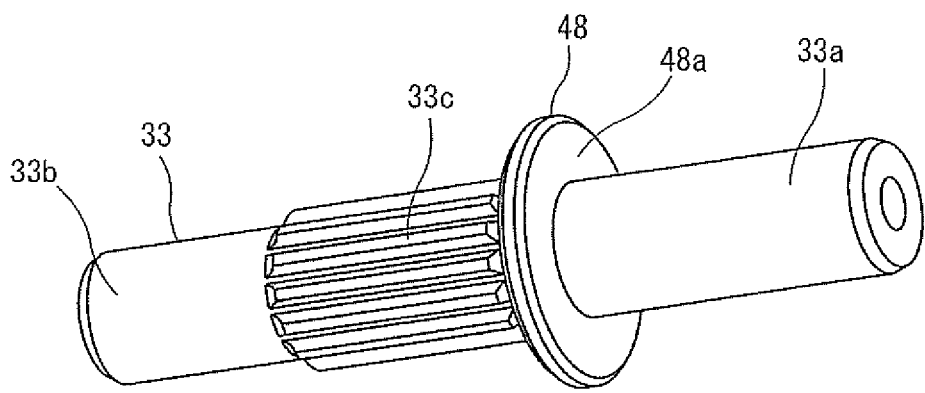
FIG. 16 is a perspective view of the pump shaft according to the second embodiment.

FIG. 15 shows a second embodiment of the present invention. FIG. 16 shows the pump shaft 33 and the second thrust limiting portion 48 according to the second embodiment. In this embodiment, although the first thrust limiting portion 49 and the first thrust receiving portion 47 are the same as those of the first embodiment, forming positions of the second thrust limiting portion 48 and the second thrust receiving portion 46 are different from those of the first embodiment.

That is, as shown in FIG. 15, the second thrust receiving portion 46 is formed into an annular recess or groove at a hole edge circumference of the second bearing hole 32a, on the housing fixing surface 32b side, of the cover member 32. That is, the second thrust receiving portion 46 is located at an adjacent position to one side portion of the rotor 34 that is one part of the pump elements.

On the other hand, the flange-shaped second thrust limiting portion 48 is located at a position corresponding to the position of the second thrust receiving portion 46, as shown in FIGS. 15 and 16. That is, the second thrust limiting portion 48 is located at a boundary between a small diameter portion on the one end portion 33a side of the pump shaft 33 and the spline ridge portions 33c of the pump shaft 33. The second thrust limiting portion 48 is formed so as to have an outside diameter and a thickness by which the second thrust limiting portion 48 can come into or loosely be fitted on the annular recess of the second thrust receiving portion 46.

Therefore, during normal rotation of the pump shaft 33, the second thrust limiting portion 48 rotates in the second thrust receiving portion 46. Then, when the thrust load in a direction of the driven side helical gear 43 side in the drawing acts on the pump shaft 33, the second limiting surface 48a of the second thrust limiting portion 48 contacts the second receiving surface 46a of the second thrust receiving portion 46. A thrust movement of the pump shaft 33 more than this contact position in the direction of the driven side helical gear 43 side is thus limited.

Hence, the same working and effect as those of the first embodiment can be obtained upon the thrust movement of the pump shaft 33 in the driven side helical gear 43 direction.

Further, since the second limiting surface 48a of the second thrust limiting portion 48 closely or absolutely contacts the second receiving surface 46a of the second thrust receiving portion 46 by a thrust force in the driven side helical gear 43 direction, oil leak from the second bearing hole 32a can be reduced.

Regarding the thrust load acting on the pump shaft 33 in an opposite direction to the driven side helical gear 43 direction, in the same manner as the first embodiment, the first thrust limiting portion 49 of the driven side helical gear 43 contacts the first thrust receiving portion 47 of the cover member 32, then the movement of the pump shaft 33 is limited.

The present invention is not limited to configurations of the above embodiments, but can be applied to not only the variable displacement oil pumps but also normal fixed-displacement oil pumps. As the oil pump, not only the vane pumps but also inscribed trochoid gear pumps and external gear pumps can be used.

Further, regarding an oil pump receiving side to which the oil pump is fixed, it is not limited to the balancer device 2, but it could be the internal combustion engine.

In each of the embodiments, as the driven gear and the external gear, the driven side helical gear 43 and the drive side helical gear 13 are used. However, as a gear that reduces noise and vibration by a large contact surface of its engaging portion, a bevel gear at which a load occurs in a rotation axis direction can be used.

In a case where the inclination of the teeth of the drive side helical gear 13 and the driven side helical gear 43 in each of the embodiments is opposite, directions of the thrust forces occurring at the pump shaft 33 are opposite directions to those in each of the embodiments. Therefore, although the thrust directions are different from those in each of the embodiments, the thrust forces can effectively be suppressed by support of the first thrust limiting portion 49 by the first thrust receiving portion 47 and support of the second thrust limiting portion 48 by the second thrust receiving portion 46.

As the oil pump and the oil pump-integrated balancer device based on the embodiments explained above, for instance, the followings are raised.

As one aspect of the present invention, an oil pump comprises: a pump housing accommodating therein a pump element that performs suction and discharge of oil by being driven and rotated; a pump shaft having a driven gear at which a thrust force occurs when transmitting a rotation force, the pump shaft being configured to be able to move relative to the pump element in an axis direction and drive the pump element by the rotation force provided from an external gear that is engaged with the driven gear; a pair of thrust limiting portions provided at the pump shaft; and a pair of thrust receiving portions provided at the pump housing and contacting the pair of thrust limiting portions respectively.

As a preferable aspect of the oil pump, the pump housing is formed by a housing body having a pump accommodating section that accommodates therein the pump element and a cover member formed so as to be thinner than the housing body and covering the pump accommodating section, one of the thrust receiving portions is provided at the cover member, and the driven gear is configured so that a thrust load acts on the one thrust receiving portion of the cover member toward the pump element when provided with the rotation force.

As a preferable aspect of the oil pump, a bearing portion that supports the pump shaft is provided at an adjacent position to the driven gear, and the driven gear is configured so that the thrust force acts on the driven gear in a direction in which the driven gear separates from the pump element when provided with the rotation force.

As a preferable aspect of the oil pump, one of the thrust limiting portions is provided at the driven gear.

As a preferable aspect of the oil pump, one pair of the thrust limiting portion and the thrust receiving portion and the other pair of the thrust limiting portion and the thrust receiving portion are provided at both sides in the axis direction of the pump shaft with the pump element sandwiched between the both pairs.

As a preferable aspect of the oil pump, the other of the thrust limiting portions is provided at an axis direction end portion of the pump shaft, and the thrust receiving portion that contacts the other thrust limiting portions is provided at an outer side of the pump housing.

As a preferable aspect of the oil pump, the other of the thrust limiting portions is provided at a middle position, in the axis direction, of the pump shaft, and the thrust receiving portion that contacts the other thrust limiting portions is provided at a position, which is adjacent to the pump element, of the pump housing.

As a preferable aspect of the oil pump, the pump element is a vane type pump element formed by a rotor that is accommodated in a pump accommodating section of the pump housing and movably provided on the pump shaft in the axis direction and a plurality of vanes that are radially provided at an outer circumferential portion of the rotor.

As a preferable aspect of the oil pump, the pump element is a variable displacement type pump element that varies a pump volume by moving a cam ring located at outer peripheries of the vanes.

As a preferable aspect of the oil pump, the cover member is formed with aluminum alloy material.

As a preferable aspect of the oil pump, a bearing hole that forms the bearing portion of the pump shaft is formed at the cover member.

As a preferable aspect of the oil pump, the driven gear is a helical gear.

As a preferable aspect of the oil pump, the rotor is movably provided relative to the pump shaft in the axis direction by spline engagement.

As another-aspect of the present invention, an oil pump-integrated balancer device comprises: a balancer shaft which is accommodated in a balancer housing and to which a rotation force is transmitted; a first power transmission member which is provided at the balancer shaft and on which a thrust force acts when transmitting the rotation force; a pump shaft having a second power transmission member on which the thrust force acts when the rotation force is transmitted from the first power transmission member; a pump element movably provided relative to the pump shaft in a rotation axis direction and performing suction and discharge of oil by the rotation force being transmitted from the pump shaft; a pump housing accommodating therein the pump element; a pair of thrust limiting portions provided at the pump shaft; and a pair of thrust receiving portions which are provided at the pump housing and which the pair of thrust limiting portions contact respectively.

As a preferable aspect of the oil pump-integrated balancer device, the balancer shaft is formed by a third power transmission member to which the rotation force is transmitted from an internal combustion engine, a drive shaft rotating integrally with the third power transmission member, a fourth power transmission member provided at the drive shaft, a fifth power transmission member engaged with the fourth power transmission member, and a driven shaft rotating integrally with the fifth power transmission member. And, the first power transmission member is provided at the driven shaft, and the third power transmission member and the second power transmission member are arranged so as to be adjacent to each other in the rotation axis direction.

As a preferable aspect of the oil pump-integrated balancer device, one of the thrust limiting portions is provided at the second power transmission member.

As a preferable aspect of the oil pump-integrated balancer device, the other of the thrust limiting portions is provided at an axis direction end portion of the pump shaft, and the other of the thrust receiving portions which contacts the other thrust limiting portion is provided at an outer side of the pump housing.

As a preferable aspect of the oil pump-integrated balancer device, the drive shaft and the driven shaft rotate at double the rotation speed of a crankshaft of the internal combustion engine, and the double rotation speed is decreased upon transmitting power from the first power transmission member to the second power transmission member.

As a preferable aspect of the oil pump-integrated balancer device, the pump housing is fixed to the balancer housing.

As a preferable aspect of the oil pump-integrated balancer device, the pump housing is formed by a housing body having a pump accommodating section that accommodates therein the pump element and a cover member formed so as to be thinner than the housing body and covering the pump accommodating section. And, one of the thrust receiving portions is provided at the cover member, and the second power transmission member is configured so that a thrust load acts on the one thrust receiving portion of the cover member toward the pump element when provided with a driving force.

The invention claimed is:

1. An oil pump comprising:
   a pump housing accommodating therein a pump element that performs suction and discharge of oil by being driven and rotated;
   a pump shaft having a driven gear at which a thrust force occurs when transmitting a rotation force, the pump shaft being configured to be able to move relative to the pump element in an axis direction and drive the pump element by the rotation force provided from an external gear that is engaged with the driven gear;
   a pair of thrust limiting portions provided at the pump shaft; and
   a pair of thrust receiving portions provided on an outer surface of the pump housing and contacting the pair of thrust limiting portions respectively.

2. The oil pump as claimed in claim 1, wherein:
   the pump housing is formed by a housing body having a pump accommodating section that accommodates therein the pump element and a cover member formed so as to be thinner than the housing body and covering the pump accommodating section,
   one of the thrust receiving portions is provided at the cover member, and
   the driven gear is configured so that a thrust load acts on the one thrust receiving portion of the cover member toward the pump element when provided with the rotation force.

3. The oil pump as claimed in claim 1, wherein:
   the pump element is a vane type pump element formed by a rotor that is accommodated in a pump accommodating section of the pump housing and movably provided on the pump shaft in the axis direction and a plurality of vanes that are radially provided at an outer circumferential portion of the rotor.

4. The oil pump as claimed in claim 3, wherein:
   the pump element is a variable displacement type pump element that varies a pump volume by moving a cam ring located at outer peripheries of the vanes.

5. The oil pump as claimed in claim 3, wherein:
   the rotor is movably provided relative to the pump shaft in the axis direction by spline engagement.

6. The oil pump as claimed in claim 2, wherein:
   the cover member is formed with aluminum alloy material.

7. The oil pump as claimed in claim 1, wherein:
   a bearing portion that supports the pump shaft is provided at an adjacent position to the driven gear, and
   the driven gear is configured so that the thrust force acts on the driven gear in a direction in which the driven gear separates from the pump element when provided with the rotation force.

8. The oil pump as claimed, in claim 7, wherein:
   a bearing hole that forms the bearing portion of the pump shaft is formed at the cover member.

9. The oil pump as claimed in claim 1, wherein:
   one of the thrust limiting portions is provided at the driven gear.

10. The oil pump as claimed in claim 1, wherein:
    one pair of the thrust limiting portion and the thrust receiving portion and the other pair of the thrust limiting portion and the thrust receiving portion are provided at both sides in the axis direction of the pump shaft with the pump element sandwiched between the both pairs.

11. The oil pump as claimed in claim 1, wherein:
one of the thrust limiting portions is provided at an axis direction end portion of the pump shaft, and
the thrust receiving portion that contacts the other thrust limiting portions is provided at an outer side of the pump housing.

12. The oil pump as claimed in claim 1, wherein:
the driven gear is a helical gear.

13. An oil pump-integrated balancer device comprising:
a balancer shaft which is accommodated in a balancer housing and to which a rotation force is transmitted;
a first power transmission member which is provided at the balancer shaft and on which a thrust force acts when transmitting the rotation force;
a pump shaft having a second power transmission member on which the thrust force acts when the rotation force is transmitted from the first power transmission member;
a pump element movably provided relative to the pump shaft in a rotation axis direction and performing suction and discharge of oil by the rotation force being transmitted from the pump shaft;
a pump housing accommodating therein the pump element;
a pair of thrust limiting portions provided at the pump shaft; and
a pair of thrust receiving portions which are provided at the pump housing and which the pair of thrust limiting portions contact respectively.

14. The oil pump-integrated balancer device as claimed in claim 13, wherein:
the balancer shaft is formed by
a third power transmission member to which the rotation force is transmitted from an internal combustion engine,
a drive shaft rotating integrally with the third power transmission member,
a fourth power transmission member provided at the drive shaft,
a fifth power transmission member engaged with the fourth power transmission member, and
a driven shaft rotating integrally with the fifth power transmission member,
the first power transmission member is provided at the driven shaft, and
the third power transmission member and the second power transmission member are arranged so as to be adjacent to each other in the rotation axis direction.

15. The oil pump-integrated balancer device as claimed in claim 14 wherein:
one of the thrust limiting portions is provided at the second power transmission member.

16. The oil pump-integrated balancer device as claimed in claim 15 wherein:
the other of the thrust limiting portions is provided at an axis direction end portion of the pump shaft, and
the other of the thrust receiving portions which contacts the other thrust limiting portion is provided at an outer side of the pump housing.

17. The oil pump-integrated balancer device as claimed in claim 14 wherein:
the drive shaft and the driven shaft rotate at double the rotation speed of a crankshaft of the internal combustion engine, and the double rotation speed is decreased upon transmitting power from the first power transmission member to the second power transmission member.

18. The oil pump-integrated balancer device as claimed in claim 13 wherein:
the pump housing is fixed to the balancer housing.

19. The oil pump-integrated balancer device as claimed in claim 13 wherein:
the pump housing is formed by a housing body having a pump accommodating section that accommodates therein the pump element and a cover member formed so as to be thinner than the housing body and covering the pump accommodating section,
one of the thrust receiving portions is provided at the cover member, and
the second power transmission member is configured so that a thrust load acts on the one thrust receiving portion of the cover member toward the pump element when provided with a driving force.

20. An oil pump comprising:
a pump housing accommodating therein a pump element that performs suction and discharge of oil by being driven and rotated;
a pump shaft having a driven gear at which a thrust force occurs when transmitting a rotation force, the pump shaft being configured to be able to move relative to the pump element in an axis direction and drive the pump element by the rotation force provided from an external gear that is engaged with the driven gear;
a first thrust limiting portion provided at the driven gear;
a second thrust limiting portion provided at a middle position, in the axis direction, of the pump shaft and having a flange-shape;
a first thrust receiving portion provided on an axial direction outer side surface of the pump housing and contacting the first thrust limiting portion; and
a second thrust receiving portion provided inside the pump housing and contacting the second thrust limiting portion,
wherein the second thrust receiving portion is formed at an annular recess that is recessed on an inner side surface of the pump housing toward the axial direction outer side surface of the pump housing with respect to a sliding surface of the inner side surface of the pump housing on which a side surface of the pump element located at an opposite side to the axial direction outer side surface of the pump housing slides, and
wherein a thickness of the flange-shaped second thrust limiting portion in the axial direction is thinner than a depth of the annular recess, and the flange-shaped second thrust limiting portion is accommodated in the annular recess.

* * * * *